April 23, 1929.  M. H. LANDIS  1,710,542
EMERGENCY LIGHTING SYSTEM
Filed July 14, 1926
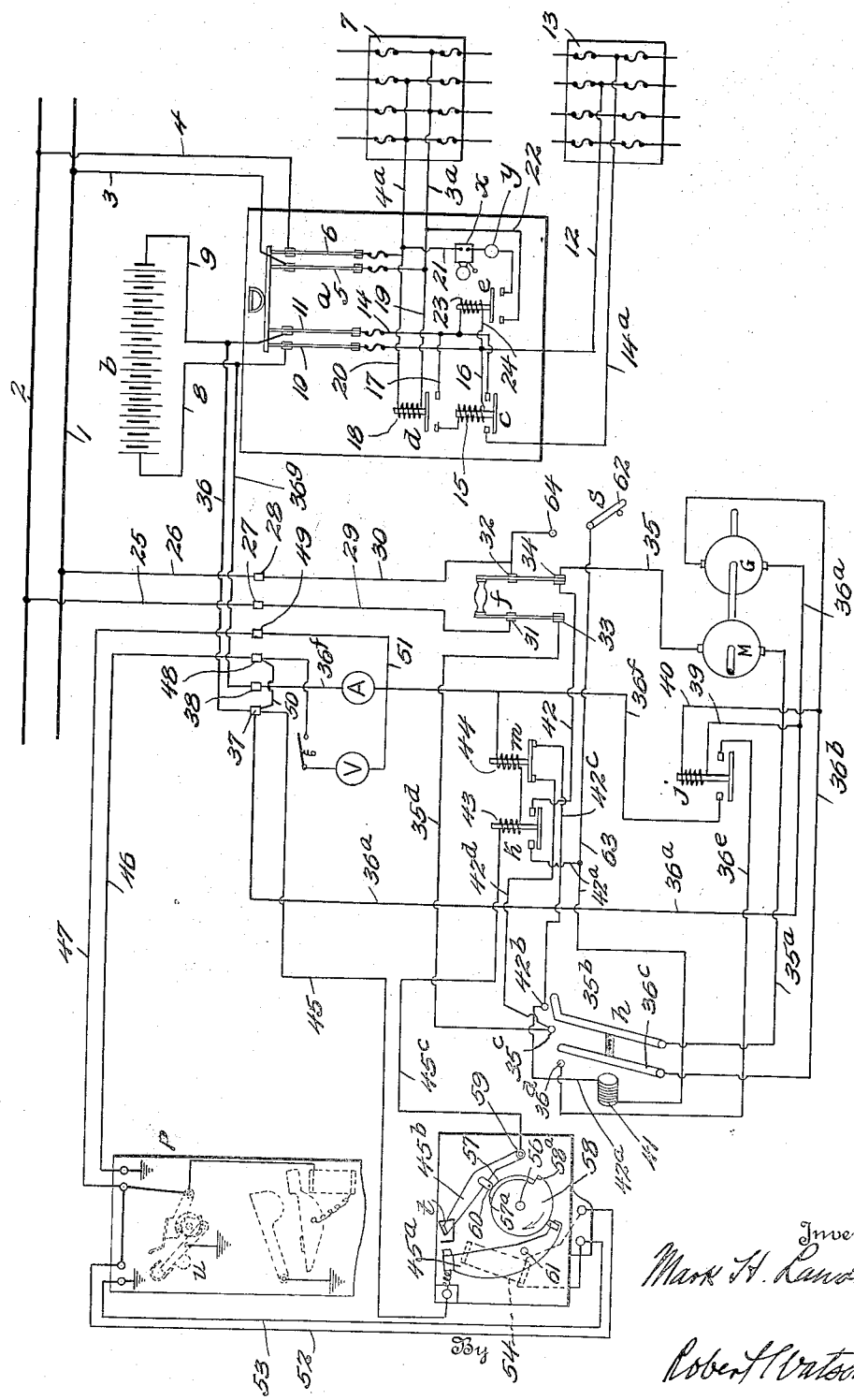

Patented Apr. 23, 1929.

1,710,542

UNITED STATES PATENT OFFICE.

MARK H. LANDIS, OF WAYNESBORO, PENNSYLVANIA.

EMERGENCY LIGHTING SYSTEM.

Application filed July 14, 1926. Serial No. 122,483.

In halls, theatres, and other buildings used for public assemblages and which are lighted by electricity derived from public service stations, it is desirable to have auxiliary lighting systems deriving current from auxiliary sources for use in emergency, in order to prevent possible panic and disorder resulting from darkness if current from the main source fails. The present invention relates to a combination of main and auxiliary lighting systems with means for automatically and instantly connecting the latter to the auxiliary current source upon failure of current in the main system, and for automatically disconnecting the auxiliary system from its current source when the supply of current is restored in the main system. The auxiliary current source in the present invention is a storage battery, and it is important in an emergency lighting system of this kind that the battery shall always be fully charged. If the time of charging the battery is left to the discretion of an individual, the battery may, at times, be allowed to run down, and it may be partly discharged at a time when an emergency requires its use, as by the failure of current from the main source. An important feature of the present invention is the means which I have provided for keeping the battery constantly charged. In carrying out this part of the invention, I provide battery charging devices, deriving power from the main current source, with electromagnetically operated switch members for connecting said devices to said source and the battery, a relay circuit for controlling the operation of said members, and a time switch for periodically closing the relay circuit. The arrangement is such that if the battery voltage is low during a period when the time switch is closed, the battery charging devices will operate to charge the battery until the time switch opens; but, if the battery voltage is normal during a period when the time switch is closed the battery charging devices will not be brought into operation. The time switch closes at relatively short intervals of time, say once an hour, and remains closed for a short period of time which may be varied as desired, so that, as illustrated in the drawing of the application, the circuits are made up to permit the battery to take a charge once every hour, and if the voltage is low the charging devices will operate, whereas, if the voltage is normal the charging devices will not operate.

For the purpose of initially charging the battery and also for charging the battery when it has been drained by relatively long and heavy discharges, I also provide manually controlled means for connecting the charging devices to the main current source and the battery, independently of the periodic controlling devices, and I also provide means for visually and audibly indicating to the operator when the battery voltage is low and a charge is required.

In many buildings, such as school houses, clock systems are installed each system comprising an electrically wound master clock and a series of secondary clocks electrically controlled by the master clock, and program machines and the like, for giving signals according to predetermined schedules, are also connected to said systems and controlled by the master clock. In the present invention, the time switch is controlled by a master clock so as to close once an hour, and the current for operating the master clock and the time switch is derived from the battery, the automatic charging of which is, in turn, controlled by the master clock and the time switch. Thus, it will be seen that the battery charging system, emergency lighting system and clock system controlled by the master clock may all be connected together in one installation in a public building requiring a clock system and an emergency lighting system.

In the accompanying drawing, the invention is illustrated diagrammatically in a single figure.

In the diagram, 1 and 2 indicate supply wires leading from an electric power station, and 3 and 4 indicate leads from the supply wires 1 and 2 to the house wires 3ª and 4ª, through the blades 5 and 6 of a four-pole main switch a. The house wires lead to a suitable distributing panel 7, to which the lamp circuits of the main house-wiring system are connected. The battery of the emergency lighting system is indicated at b, and the terminals of this battery are connected by leads 8 and 9 to the blades 10 and 11 of the four-pole main switch. A conductor 12 leads from the blade 10 to the distributing panel 13 of the emergency house-wiring system, and a conductor 14—14ª leads from the blade 11 through a normally open electromagnetic switch *c* to the auxiliary distributing panel, to which the wires of the auxiliary house wiring system are connected. The energizing coil 15 of the electromagnetic switch *c* is connected by conductors 16 and 17 to the wires 12 and 14, leading from the battery. A relay *d* controls the circuit of the magnet 15, and this relay has a high resistance coil 18 connected by conductors 19 and 20 to the house wires 3ª and 4ª of the main lighting system.

The operation of the system as thus far described is as follows: When the main switch *a* is closed, assuming that the main power plant is operating normally, current will flow from the supply circuit 1—2 through the conductors 3—4 to the blades 5—6 of the main switch and thence through the wires 3ª and 4ª to the house wires leading from the panel 7. The high resistance solenoid 18 of the relay *d* becomes energized by current from the main supply wires the moment the main switch is closed, and this relay opens the circuit of the coil 15 of the electromagnetic switch *c* so that this coil remains dead and the switch *c* remains open. Hence, no current can flow from the battery through the conductor 14 to the auxiliary lighting system. Thus, while the current supply to the main house wiring system is normal, the auxiliary lighting system will be dead. If, for any reason, the current from the main current source fails, the coil 18 of the relay *d* will be de-energized and the core of this relay will drop and close the circuit leading from the battery to the coil 15 of the electromagnetic switch *c*. This coil, being energized, will then cause the closure of the switch *c*, and thus the circuit through the conductor 14 to the auxiliary house wiring system will be completed and the lamps in this system will receive current from the battery, and the house will be lighted by current from the battery the moment that the current from the main source fails. If, now, the supply of current from the main source is restored, the coil of the relay *d* will be immediately energized and this relay will open the circuit of the magnet coil 15 of the switch *c* and this switch will open, cutting off the supply of current from the battery to the auxiliary lighting system. Thus, one lighting system or the other will always be connected to its current source while the main switch *a* is closed.

It is important in an emergency lighting system to always keep the storage batteries fully charged, and it is desirable to have visible and audible signals for indicating when the battery is not fully charged. In order to give these indications, an electric bell *x* and a signal lamp *y* are arranged in series in a circuit 21—22, connected to the house leads 3ª—4ª of the main supply system, through a relay switch *e*, having a coil 23 which is connected in a circuit 24, leading from the conductors 12 and 14 of the battery system. The coil of the relay *e* is of high resistance and is constantly in circuit with the battery when the main switch *a* is closed, and hence, the relay normally keeps the signaling circuit open. If, however, the voltage of the battery becomes low, the coil of the relay switch will drop its core and close the signaling circuit. Assuming that an alternating current is flowing in the main lighting system, this current will cause the bell to ring and will also cause the signaling lamp, which is in series with the bell, to flicker, thus calling attention to the fact that the battery voltage is below normal.

For charging the battery, I provide a motor generator, the motor part of which is indicated by the letter M, while the generator part is indicated by the letter G. A two-pole main switch *f* is provided for connecting the motor to the supply wires 1—2, leading from the main current source. Thus, service wires 25—26 extend from the supply wires to terminals 27—28 on a suitable panelboard, and from these terminals wires 29—30 lead to the contacts 31—32 of the switch *f*, respectively. When the switch is closed, one of its blades connects the contact 31 with the switch terminal 33, and the other blade connects the contact 32 with the terminal 34.

The motor circuit extends from switch terminal 34, through conductor 35 to the motor, thence by conductor 35ª to arm 35ᵇ of a normally open two-pole electromagnetic switch *h*, thence from the contact 35ᶜ of said switch, (which is adapted to be engaged by said arm) through conductor 35ᵈ to the terminal 33 of the main switch *f*. The main switch is always closed, and it will be evident from following the circuit just traced that the motor will be operated by current from the supply wires 1—2, when the switch *h* is closed, and that the motor will stop when said switch is opened.

The generator is connected in a charging circuit leading to the battery terminals through the normally open starting and stopping switch *h* and through a normally open electromagnetic switch *j*. Thus, a conductor 36 extends from the battery lead 9 to the panelboard terminal 37, and a conductor 36ª extends from said terminal to one brush of the generator. From the other brush of the generator, a conductor 36ᵇ extends to the switch arm 36ᶜ of the switch *h*, which arm is adapted to engage a stationary contact 36ᵈ when the switch is closed. From the latter contact the charging circuit extends through conductor 36ᵉ to the normally open switch *j*, and from said switch conductor 36ᶠ extends to the ammeter A, and thence to the panel-board terminal 38, which is connected to the battery through conductors 36$^g$ and 8.

The switch $j$ has a high resistance coil connected across the terminals of the generator by conductors 39 and 40, which are connected to the generator leads 36$^a$ and 36$^b$. This switch closes only when its coil is affected by the full impressed voltage of the generator, which, of course, is higher than the battery voltage, and the switch opens before the generator voltage drops to the value of the battery voltage, thereby preventing any possible discharge of the battery through the generator and reversal of polarity of the latter.

From the foregoing, it will be evident that when the starting and stopping switch $h$ is closed, the motor will operate and drive the generator, but the latter will not be connected to the battery until it has acquired speed enough to deliver its maximum voltage, when the switch $j$ will close the charging circuit. When the switch $h$ opens, the motor circuit and the charging circuit will both be opened at said switch and the motor and generator will slow down and stop. As the generator commences to slow down and its voltage commences to drop, the switch $j$ will open before the generator voltage drops to that of the battery.

The starting and stopping switch $h$ opens by gravity and is closed by a magnet 41 which is energized by current flowing from the main supply wires 1 and 2, and the circuit of this magnet is controlled automatically by two relay switches $k$ and $m$, the coils of which are periodically connected to the battery circuit by a time switch $t$. The arrangement is such that if the battery voltage is below normal when the time switch closes, the circuit of the magnet 41 will be made up and the switch $h$ will close, starting the motor generator which will operate to charge the battery; whereas, if the battery voltage is normal at the time of closure of the time switch, the circuit of the magnet 41 will not be made up and the switch $h$ will remain open so that no charge will be delivered to the battery.

The automatically controlled circuit of the magnet 41 extends from the terminal 34 of the main switch $f$ by conductor 42 to the contacts of the normally open relay switch $k$, thence by conductor 42$^a$ through the coil of the magnet 41 to an auxiliary contact 42$^b$, which is adapted to be engaged by the switch arm 35$^b$, thence by conductor 42$^c$ to the contacts of the normally closed relay switch $m$, thence by conductor 42$^d$ to the main contact 35$^c$ of the switch $h$, thence by conductor 35$^d$ to the terminal 33 of the main switch $f$. It will be seen that the controlled circuit just traced will be completed only when both of the relay switches $k$ and $m$ are closed. It will also be seen that when the switch $h$ is closed, its contact arm 35$^b$ will connect the contacts 42$^b$ and 35$^c$ and form a shunt across that part, 42$^c$—42$^d$, of the controlled circuit which includes the contact members of the relay switch $m$. Thus, both of the relay switches $k$ and $m$ must be closed to initially complete the controlled circuit through the magnet of the switch $h$, but after this latter switch has closed, shunting the switch of the relay $m$, the operation of this relay has no effect upon the controlled circuit, and the switch $h$ will remain closed until the circuit of its magnet is opened by the opening of the relay switch $k$.

The energizing coils 43 and 44 of the relays $k$ and $m$, respectively, are connected in series with one another in a circuit which extends through the time switch $t$ from the battery terminals 37 and 38. Thus, a conductor 45 extends from the battery terminal 37 to one contact member 45$^a$ of the time switch, and from the other terminal 45$^b$ of the latter switch a conductor 45$^c$ extends to the coils 43 and 44 of the relays and thence to the conductor 36$^f$ leading to the battery terminal 38.

When the time switch closes, current from the battery will pass through both of the relay coils. The winding of the coil 43 of relay $k$ is such that this relay will close each time the relay circuit is completed at the time switch, whether the voltage of the battery is normal or below normal, while the winding of the magnet of the relay $m$ is such that the latter will operate to open the controlled circuit only when the battery voltage is normal. Thus, if the battery is fully charged when the time switch closes, the relay $k$ will operate to complete the circuit to the magnet of the switch $h$; but the relay $m$ will also operate at the same time to interrupt said circuit so that no current will flow through the coil of the magnet, and the switch $h$, which controls the operation of the motor generator set, will remain open. If, however, the battery voltage is below normal at the time when the time switch closes, the relay $k$ will operate to close the controlled circuit and the relay $m$ will not operate, so that the circuit of the magnet 41 will be completed, the switch $h$ will close, the motor generator will be started, and when the voltage of the generator is high enough to cause the voltage switch $j$ to close, a charge will be delivered to the battery. The charging current once started will continue until the contacts of the time switch separate, when the coil of the relay $k$ will be de-energized and this relay will operate to open the circuit of the magnet of the switch $h$, which switch will open, stopping the motor and opening the circuit from the generator to the battery.

The time switch closes its contacts once every hour for a definite period of time, the duration of which may be regulated as desired. This switch is operated by a secondary clock mechanism controlled by a self-winding master clock $p$. This clock is electromagnetically wound, the current for the winding magnet being operated from the battery through conductors 46 and 47, leading from the panelboard terminals 48 and 49, respectively. The terminal 48 is connected to the battery terminal 37 by conductor 50, and the terminal 49 is connected to the battery terminal 38 through conductors $36^r$ and 51. A branch circuit 52—53 extends from the master clock to the magnet 54 of the secondary clock mechanism, and once a minute the master clock operates a switch $u$ to momentarily close the circuit 52—53. At each closure of the switch, the magnet 54 is energized and moves the secondary clock mechanism one step. The shaft 56 of the latter mechanism makes one revolution in an hour and carries two snail cams 57 and 58, which are adjustable relatively to one another so that the shoulder $57^a$ on the one cam can be set as far in advance of the shoulder $58^a$ on the other cam as desired. The contact arm $45^b$ of the switch $t$ is pivoted at its lower end, as shown at 59, and leans toward the cam, and it has a roller 60 which bears upon the cam. The arm $45^a$ is pivoted between its ends at 61, and its lower end carries a roller which bears against the cam 58 while its upper end leans away from the cam. As the cams rotate step by step, in the direction of the arrow, the shoulder of the cam 57 passes the roller of the arm $45^b$ and the latter arm drops into engagement with the arm $45^a$, closing the circuit to the coils of the relays $k$ and $m$. As the cams continue to rotate, the shoulder of the cam 58 passes beyond the roller on the arm $45^a$ and the latter arm then drops away from the arm $45^b$ and opens the circuit to said relays. It will be seen that the period of contact between the switch arms will depend upon the distance between the shoulders on the cams. This period, which will usually be from ten to fifteen minutes, may be varied as desired by relative adjustment of the cams.

For initially charging the battery, or for charging the battery in an emergency, at a period when the time switch is not closed and when there may have been an excessive drain on the battery, I provide the manually operable switch $s$, which is normally open and which is closed only for this purpose. The switch arm 62 is connected by conductor 63 to the conductor $42^a$, and the contact 64 of the switch is connected to the conductor 30 leading from the supply wire 1 to the contact 32 of the main switch $f$. Thus, when the switch $s$ is closed, current will flow from the supply wire through conductor 63 to conductor $42^a$, without passing through the relay switch $k$, which will be shunted, and the circuit through the magnet 41 of the motor controlling switch $h$ will be completed through conductors $42^a$ and $42^c$, relay switch $m$, conductor $42^d$, and conductor $35^a$ to the main switch contact 33, which is connected through said switch to the supply wire 2. The function of the switch $s$ therefore is to permit the operator to open and close the starting switch independently of the automatic devices and to keep the starting switch closed as long as desired.

It is believed that the arrangement and operation of the system will be plain from the foregoing. It will be evident that with the system described, if the main lighting system fails for any cause, the emergency lighting system will be automatically and instantly brought into use, and that the storage battery which supplies the current for the latter will always be charged and ready for use.

In public buildings, such as school houses, master clocks are commonly employed to control secondary clocks, and also to control program machines for operating signals according to predetermined schedules, and the master clock of such an installation may be used to control the time switch of the herein described battery charging system. When the two systems are associated together, the clock system will always be supplied with battery current at full voltage instead of failing because of the running down of the batteries, as sometimes occurs in the use of clock systems.

What I claim is:

1. The combination with a battery, a current source for charging the battery, a normally open switch for connecting said source to the battery, time-controlled means for periodically closing said switch, and means for preventing the closure of said switch when the battery voltage is normal.

2. The combination with a battery, a current source for charging the battery, a normally open switch for connecting said source to the battery, time-controlled means for intermittently closing said switch for definite periods, and means for preventing the closure of said switch if the battery voltage is normal during such periods.

3. The combination with a battery, a current source for charging the battery, a normally open switch for connecting said source to the battery, time-controlled means for intermittently closing said switch for definite periods, and means for preventing the closure of said switch if the battery voltage is normal during such periods and for permitting the switch to close if the battery voltage is below normal during such periods.

4. The combination with a main current source, a battery, a motor generator, a normally open main switch for connecting the motor to said main current source and the generator to the battery, time-controlled means for periodically closing said switch, and means for preventing the closure of said switch when the battery voltage is normal.

5. The combination with a main current source, a battery, a motor generator, a circuit from the main source to the motor, a circuit from the generator to the battery, a normally open main switch for closing said circuits, time controlled means for periodically closing said switch only when the battery voltage is low, and a normally open electromagnetic switch in the generator circuit having its coil connected across the generator circuit and operating to close said circuit only when the generator voltage is higher than the battery voltage.

6. The combination with a main current source, a secondary current source and charging means for the latter, of a normally open switch for connecting the charging means to the secondary source, a magnet for closing said switch, a circuit connected to one of said sources and including the coils of said magnet, time-controlled means for closing said circuit periodically, and means for preventing the closure of said circuit when the voltage of said secondary source is normal.

7. The combination with a main current source, a secondary current source and charging means for the latter, of a normally open switch for connecting the charging means to the secondary source, a magnet for closing said switch, a circuit connected to said main current source and including the coils of said magnet, time-controlled means for closing said circuit periodically, and means for preventing the closure of said circuit when the voltage of said secondary source is normal.

8. The combination with a main current source, a secondary current source and charging means for the latter, of a normally open switch for connecting the charging means to the secondary source, a magnet for closing said switch, a circuit connected to one of said sources and including the coils of said magnet, two relay switches in said circuit, one normally open and the other normally closed, a relay circuit extending from said secondary source and including the coils of said relay switches, and a time-controlled switch adapted to close said relay circuit periodically, said normally open relay switch being adapted to close at each closure of the relay circuit and said normally closed relay switch being adapted to open during closure of the relay circuit only when the voltage of said secondary source is normal.

9. The combination with a main current source, a battery, a motor generator, a circuit from said main source to the motor, and a circuit from the generator to the battery, of a normally open main switch for closing said circuits, a magnet for closing the main switch, a circuit for said magnet connected to said main current source, normally open and normally closed relay switches in said magnet circuit, a relay circuit extending from the battery and including the coils of said relay switches, and a time-controlled switch adapted to close said relay circuit periodically, said normally open relay switch adapted to close each time the relay circuit is closed and said normally closed relay switch adapted to open, when the relay circuit is closed, only when the battery voltage is normal.

10. The combination with a main current source, a battery, a motor generator, a circuit from said main source to the motor, and a circuit from the generator to the battery, of a normally open main switch for closing said circuits, a magnet for closing the main switch, a circuit for said magnet connected to said main current source, normally open and normally closed relay switches in said magnet circuit, means for short-circuiting said normally closed relay switch when the main switch closes, a relay circuit extending from the battery and including the coils of said relay switches, and a time-controlled switch adapted to close said relay circuit periodically, said normally open relay switch adapted to close each time the relay circuit is closed and said normally closed relay switch adapted to open, when the relay circuit is closed, only when the battery voltage is normal.

11. The combination with a battery, a current source for charging the battery, a normally open switch for connecting said source to the battery, a master clock operated by current from the battery, a time switch controlled by the master clock, means controlled by said time switch for closing said normally open switch periodically, and means for preventing the closure of said last mentioned switch when the battery circuit is normal.

In testimony whereof I hereunto affix my signature.

MARK H. LANDIS.